United States Patent [19]
Conover

[11] Patent Number: 5,867,934
[45] Date of Patent: Feb. 9, 1999

[54] SMALL ANIMAL TRAP

[76] Inventor: Gerret B. Conover, 140 Plains Rd., Windham, Conn. 06280

[21] Appl. No.: 769,011

[22] Filed: Dec. 18, 1996

[51] Int. Cl.$^6$ .................................................. A01M 23/20
[52] U.S. Cl. .................................................................. 43/61
[58] Field of Search .................................. 43/60, 58, 61

[56] References Cited

U.S. PATENT DOCUMENTS

| | | | |
|---|---|---|---|
| 443,975 | 12/1890 | Pead ............................................ | 43/61 |
| 1,011,207 | 12/1911 | Kemp . | |
| 1,399,630 | 12/1921 | Livezey . | |
| 1,590,879 | 6/1926 | Boynton . | |
| 1,735,786 | 11/1929 | Pearl . | |
| 2,387,811 | 10/1945 | Smith .......................................... | 43/61 |
| 2,447,147 | 8/1948 | Warner ........................................ | 43/61 |
| 2,460,417 | 2/1949 | Goostrey ..................................... | 43/61 |
| 2,478,605 | 8/1949 | Symens ....................................... | 43/61 |
| 2,599,017 | 6/1952 | Rogers ........................................ | 43/61 |
| 2,692,453 | 10/1954 | Wingfield .................................... | 43/61 |
| 3,348,331 | 10/1967 | Williams ..................................... | 43/61 |
| 3,483,652 | 12/1969 | Hanlan . | |
| 4,187,634 | 2/1980 | Kintz .......................................... | 43/61 |
| 4,310,984 | 1/1982 | Brubaker, Jr. . | |
| 4,590,704 | 5/1986 | Volk ............................................ | 43/61 |
| 4,829,701 | 5/1989 | ImBrogno ................................... | 43/61 |
| 4,899,484 | 2/1990 | Morin .......................................... | 43/61 |
| 4,912,872 | 4/1990 | Wynn .......................................... | 43/61 |
| 5,199,210 | 4/1993 | Nastas ......................................... | 43/61 |
| 5,345,710 | 9/1994 | Bitz . | |
| 5,367,820 | 11/1994 | Lafforthun .................................. | 43/61 |

Primary Examiner—Kurt Rowan
Attorney, Agent, or Firm—Fishman, Dionne Cantor & Colburn

[57] ABSTRACT

A rugged, low cost small animal trap is disclosed. The trap comprises (1) unitary setting mechanism, (2) swingably mounted bait holder, (3) trap door, and (4) a cage body. One end of the trap is fixed closed and the trap door is mounted slidably at the other end of the trap for movement between a first position which is set in an open position supported on at least two points on the externally controlled unitary setting mechanism and a second gravity closed position. The removable bait holder is baited by removing the handle and cover and then after the handle and cover are replaced, the trap is then externally set. When an animal moves the bait holder by pushing, the setting mechanism is moved toward the closed fixed end, thereby allowing the trap door to close by means of gravity and trapping the small animal alive.

3 Claims, 3 Drawing Sheets

SMALL ANIMAL TRAP

BACKGROUND OF THE INVENTION

1. Field of the Invention

This invention relates generally to traps for animals, and especially small animals such as mice and the like. More particularly, this invention relates to a live small animal trap which is rugged, economical, simple to set and easy to bait.

2. Brief Description of the Prior Art

Live traps for small animals are numerous and well known in the field. Such traps generally comprise a trap housing and at least one door, which in a first open set position allows the animal to enter the trap housing, and in a second closed position closes the housing to prevent an animal from leaving the trap. Many different door closing mechanisms are disclosed in the prior art and those of particular interest generally rely upon the forces of gravity to move the door from the first open position to the second closed position when the latching mechanism has been activated.

A search of prior art discloses numerous patents in this field. Pertinent prior art is exemplified by U.S. Pat. Nos. 2,478,605 to Symens; 3,483,652 to Hanlan, 4,310,984 to Brubaker, Jr., and 5,345,710 to Bitz. The tripping mechanisms of the prior art traps generally rely on single point setting of the trap latch.

Ideally, trap housings are sized to accommodate the size of the animal to be trapped. However, in the case of traps designed for mice and other small animals, the trap housings are usually oversized in order to permit baiting of the trap, because a trap housing sized for a chipmunk or mouse would be too small to accommodate an adult hand. Such oversized traps are wasteful of materials in making these oversized traps, and thus uneconomical to produce. Such traps are further limited in where they may be placed. Despite the numerous prior art, there still remains a need for an improved live capture small animal trap that is reliable, simple to set, and that can be conveniently set by a without requiring an oversized trap.

SUMMARY OF THE INVENTION

The above-discussed and other problems and deficiencies of the prior art are overcome or alleviated by the improved rugged, low cost, easily set and baited small animal trap of the present invention. While the invention is described in terms of a trap for mice, it is to be understood that other sizes may also be manufactured for trapping of other small or medium-sized animals, for example, chipmunks, rabbits and opossums, raccoons.

In accordance with the present invention, a low cost, rugged small animal trap is provided which comprises the traditional four sections of (1) a unitary setting mechanism to hold the trap door in the open position prior to the entrance of an animal into the trap; (2) a swingably mounted bait holder which responds to the animal's movement caused by the animal's effort to seize the bait, which movement activates (trips) the mechanism allowing the trap door to close the trap preventing the animal's escape; (3) a trap door which closes the trap after the mechanism has tripped; and (4) a cage body consisting of a floor, end wall, side walls and cage portion.

The unitary setting mechanism is designed with an integral external setting button at one end of the trap, which, at the opposite end (the door end) of the trap provides two support points to hold a trap door in the open position. The side walls are grooved to accept the aforementioned trap door, a wire mesh floor and at the closed end, a wire mesh end piece. In another important feature of the invention, the wire mesh tap cover is removable, to simplify baiting the trap, and to allow the trap to retain is smaller size. The wire mesh trap cover is held in place by a convenient carrying handle which can be detached to remove the wire mesh cover for the baiting operation.

The setting mechanism is connected to a bait holder such that when the bait holder is pushed by an animal that has entered into the trap, the movement activates the setting mechanism so that the trap door is allowed to close by means of gravity. It should be noted that the connection between the setting mechanism and the bait holder is detachable without any tools. This means that the bait holder can be removed from the trap for baiting away from the trap. There is an optional locking fastener by which the trap door can be secured when it is desired to move the trap after capture of a small animal.

Importantly, the presence of two support points ensures that the door falls straight down when the setting mechanism is tripped by the animal. In contrast to the prior art, the two support points which hold the trap door in the open position ensure stable positioning of the trap door so that the trap door will not bind when descending in the slots when closed by means of the forces of gravity. Additionally, the integral external setting button minimized the amount of handling of the trap, thereby reducing the amount of human scent left behind.

An additional feature of the invention is the materials used are both rugged and economical and of course the trap can be reused many times because of this aforementioned ruggedness.

Still another feature of the present invention is that it can safely catch a small animal for safe removal to another location for both the captured animal and the person handling the trap.

The above-discussed and other features and advantages of the present invention will be appreciated and understood by those of ordinary skill in the art from the following detailed discussion and drawings.

BRIEF DESCRIPTION OF THE DRAWINGS

Referring now to the drawings, wherein like elements are numbered alike in the several figures.

DESCRIPTION OF THE PREFERRED EMBODIMENT

Figure 1:
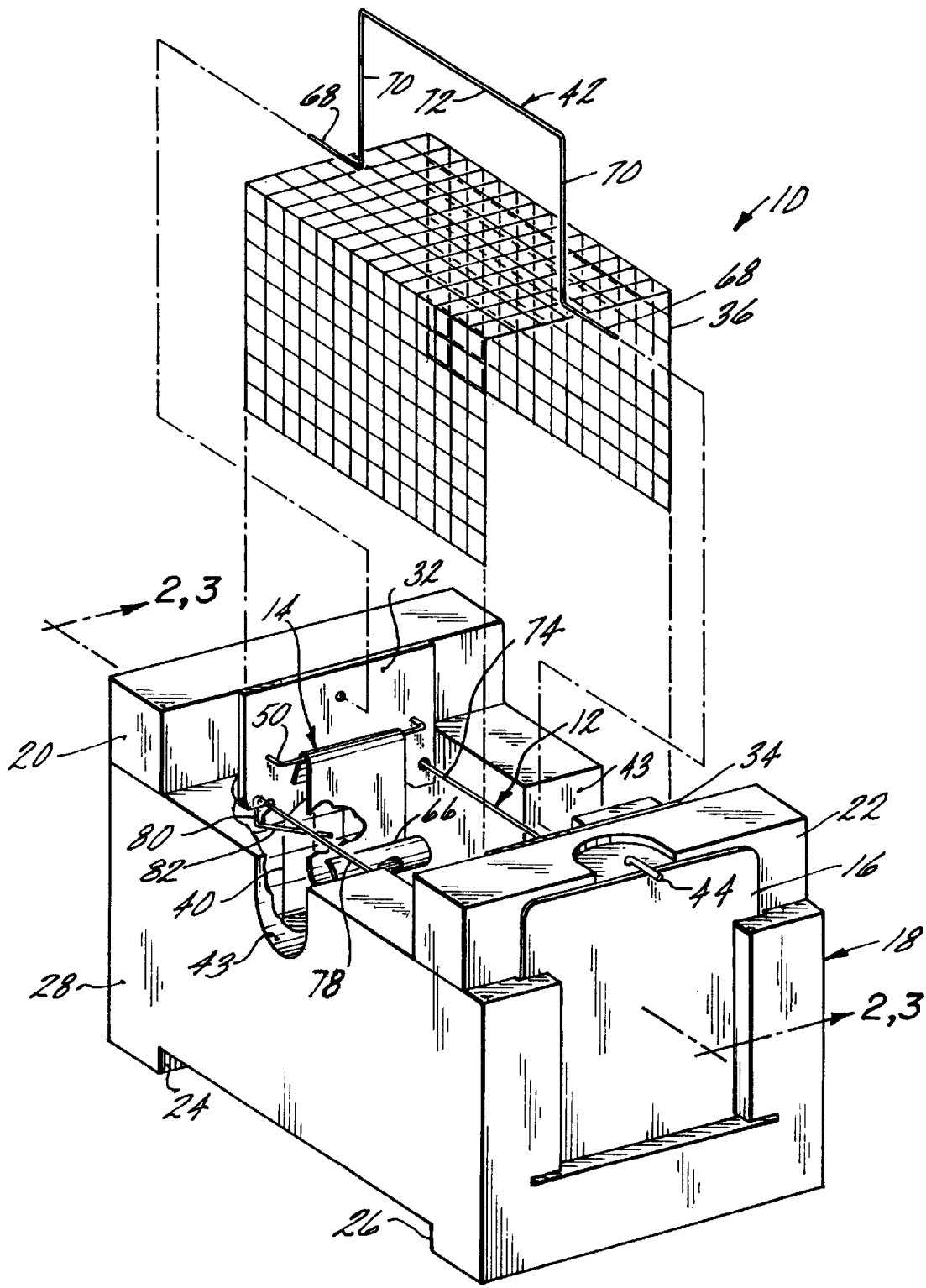
FIG. 1 is a perspective view, partly in broken, of a small animal trap showing the trap door in a closed position, and the top of the wire caged removed, allowing access to the bait holder in accordance with the present invention

Referring first to FIG. 1, the small animal trap of the present invention is shown generally at 10. Referring now to FIGS. 1–4, the small animal trap 10 is comprised of four basic elements, (1) unitary setting mechanism 12, (2) swingably mounted bait holder 14, (3) trap door 16 and (4) a cage body 18, which consists of two headers 20, 22; two bases 24, 26; two sides 28, 30; two guide plates 32, 34; a wire mesh cover 36; a wire mesh floor 38; a wire mesh end piece 40; a carrying handle 42; and an optional trap door locking fastener 44.

The two headers 20, 22; the two bases 24, 26; and the two sides 28, 30 are all preferably made of clear pine wood. Of course, any other suitable materials such as molded plastics may be used. Additionally, it is possible to combine 20, 22, 24, 26, 28, 30 into one single molded piece. In the preferred separate parts wood version, the six parts 20, 22, 24, 26, 28, 30 are finished by known methods and are smooth and free of marks and imperfections prior to their assembly. The parts are screwed or otherwise fastened together by any suitable known means (the fasteners not shown in the several FIGURES).

Headers 20, 22 are preferably ¾" square and 3½" long. Midway along the length of 20, 22 a ⅛" diameter×¼" deep hole is provided so as to accept the ends of carrying handle 42 which also locks into place wire mesh cover 36.

Bases 24, 26 are also ¾" square×½" long to match up with headers 20, 22. However, a ¾" long×½" deep notch is cut into each end of bases 24, 26 so that the two sides 28, 30 will fit neatly into the four notches of bases 24, 26 when assembled.

Sides 28, 30 are mirror images of one another. Sides 28, 30 are rectangular in shape and are preferably 5½" long, 2¼" high and ¾" thick. There is preferably a 0.090" wide and ¼" deep groove that is cut into the sides 28, 30, and located ¼" from either end of sides 28, 30. Likewise, there is a similar 0.090" wide, ¼" deep groove located ½" from one of the longitudinal edges of sides 28, 30. The grooves near the two ends receive either the trap door 16 or the wire mesh end piece 40 interchangeably. The grooves near the longitudinal edges of sides 28, 30 receive the wire mesh floor 38 when the sides 28, 30 are properly assembled in mirror image relationship to one another. It should be noted that this design makes for a rugged assembly requiring a minimum number of fasteners (not shown). Additionally, there is preferably a 1" wide×¾" deep finger notch 43 whose center line is located 2 9/16" from the end of sides 28, 30 which is to receive wire mesh end piece 40. Notch 43 allows for easy removal and replacement of wire mesh cover 36 after disengagement of carrying handle 42 for the baiting operation or any other reason for removal of wire mesh cover 36.

Guide plates 32, 34 and trap door 16 are preferably made of flat aluminum stock, preferably 0.031" thick and finished and painted by known methods. Guide plates 32, 34 and door 16 are to be free of any sharp edges. Trap door 16 is preferably 2⅜" square. Guide plates 32, 34 are sized to be fastened to line up with the inside top edges 46, 48 respectively of headers 20, 22 and extend downwardly far enough from inside top edges 46, 48 to retain settling mechanism 12 in preferably ⅛" diameter guide holes located preferably 1 1/16" from top edges 46, 48 of headers 20, 22. The ⅛" diameter guide holes are preferably 1½" apart equidistant from the side edges of guide plates 32, 34.

Guide plates 32, 34 are essentially rectangular in shape, preferably 1⅞" long and 1¼" deep, so that they cover the exposed edge of header 20 to protect it from gnawing by animals. Preferably, there are two 1/16" diameter holes located 5/16" equidistant from top edges 46, 48, and the side edges (the edges that are 1¼" deep) for mounting fasteners such as brass nails (fasteners not shown in the FIGURES) used to assemble guides 32, 34 to headers 20, 22 respectively.

There are two additional holes, also preferably 1/16" diameter, located on a center line that is ½" down from top edges 46, 48 which are spaced in line with the guide holes for setting mechanism 12 and these two holes are for the insertion of bait holder hanger 50 which retains bait holder 14 loosely (in free hinge position), both of which will be discussed in detail hereinafter. It should be noted that other metals or materials could be used for guide plates 32, 34, trap door 16 and bait holder 14 but it is essential that the finished product is compatible with and corrosion resistant to the environment to which the traps are subjected.

Bait holder 14 is also made of the same material (that is, 0.031" thick flat aluminum stock), and is polished. Bait holder 14 has a basically rectangular shape after forming that is preferably 1½" high by 1" wide and is comprised of three elements, (1) a hinge element 52, (2) a straight element 54 and (3) a bait holding elements 56. Hinge element 52 is preferably formed around a ⅛" I.D. diameter 58 with a straight lip element 60 that preferably extends ⅜" from the O.D. formed by I.D. diameter 58. I.D. diameter 58 is sized and has a sufficient clearance so as to be slipped over bait holder hanger 50 (to be described hereinafter) in hinged relationship, one to the other.

Edge 62 of straight lip element 60 is preferably shorter than the width of 1" by means of two ⅛"–3/16" equal triangular cut outs. The straight element 54 blends smoothly in an arcuate curve to bait holding element 56 which is formed preferably around a ¼" diameter I.D. 64. Bait holding element 54 is chamfered equally from each 1½" long side to a ¾" wide end edge 66. Additionally there is preferably a ¼" diameter hole centrally located to help hold bait such as peanut butter or the like. The hole and the hollow "J-shaped" portion of the bait hook ensure that the animal pushes on the bait hook, thus tripping the setting mechanism.

Carrying handle 42, trap door locking fastener 44, bait holder hanger 50 and setting mechanism 12 are all preferably formed from 0.0625 diameter corrosion resistant music wire (or any other suitable material). Additionally, setting mechanism 12 preferably has a wooden knob that is preferably ¼" diameter×¼" long which is finished and painted in the same manner as the other wooden parts (headers 20, 22, bases 24, 26 and sides 28, 30) discussed in detail hereinbefore. Of course, the knob for setting mechanism 12 could be made of any other suitable material.

Carrying handle 42 has preferably an overall length of 4". There are two preferably ⅜" long header engagement segments 68 which lock in place wire mesh cover 36. Wire mesh cover 36 will be discussed in detail hereinafter. As shown for example in FIG. 2, a single hole in each of plates 32, 34, centered ¼" down from the top of plates 32, 34, receives the ends of engagement segments 68. Preferably, corresponding holes are drilled into headers 20, 22 to receive engagement segments 68, and hold them more securely. Extending upwardly from header engagement segments 68, are two upright handle extensions 70 preferably 1½" long, which join smoothly into a straight handle grip segment 72 which is preferably 2¾" long.

Optional trap door locking fastener 44 is simply an "L" shaped piece of piano wire (or other suitable material) with preferably ¼" long legs, one leg of which is lockingly inserted into header 22 in the middle, and the other leg is then turned 90° to extend over the middle of one edge of trap door 16 to present trap door 16 from opening after capture of an animal for safe transportation of the trap. Other fasteners known in the art may be used.

Bait holder hanger 50 is "U" shaped, and has a straight hanger segment that is preferably 1½" long which blends into two extension legs at each end that are preferably ¾" long. The two extension legs are driven into or otherwise fastened to wooden header 20 but must extend far enough away from header 20 so that there is sufficient space to hang bait holder 14 so bait holder 14 will move freely in hinged relationship when bait holder 14 is pushed toward header 20.

Setting mechanism 12 is a basically "U" shaped single piece and is comprised of the following five segments: (1) a knob holding segment 74 (shown in FIG. 1); (2) a trap door supporting segment 76 (shown in FIG. 2); (3) an angular extension holding segment 78 which is parallel to knob holding segment 74 (shown in FIG. 1); (4) a descending segment 80 and (5) an angular segment 82. Knob 84 has been discussed in detail hereinbefore and will not be further discussed hereinafter. It should be noted that all bends joining the five segments 74, 76, 78, 80 and 82 are preferably ⅛" radii and should blend in smoothly one to the other without cracks or nicks or other imperfections.

Knob segment 74, trap door supporting segment 76 and angular extension holding segment 78 are preferably 5⅜" long, 1½" long and ¹¹/₁₆" long respectively. Descending segment 80 extends downwardly to angular segment 82 preferably ½" and descending segment 80 joins angular segment 82 at preferably a 65° included angle to angular extension holding segment 78 and angular segment 82 is preferably ¾" long to its end. Attached between angular extension holding segment 78 and angular segment 82 is descending segment 80 wherein one end of descending segment 80 is attached to angular extension holding segment 78 and the other end is attached to angular segment 82.

Figure 2:
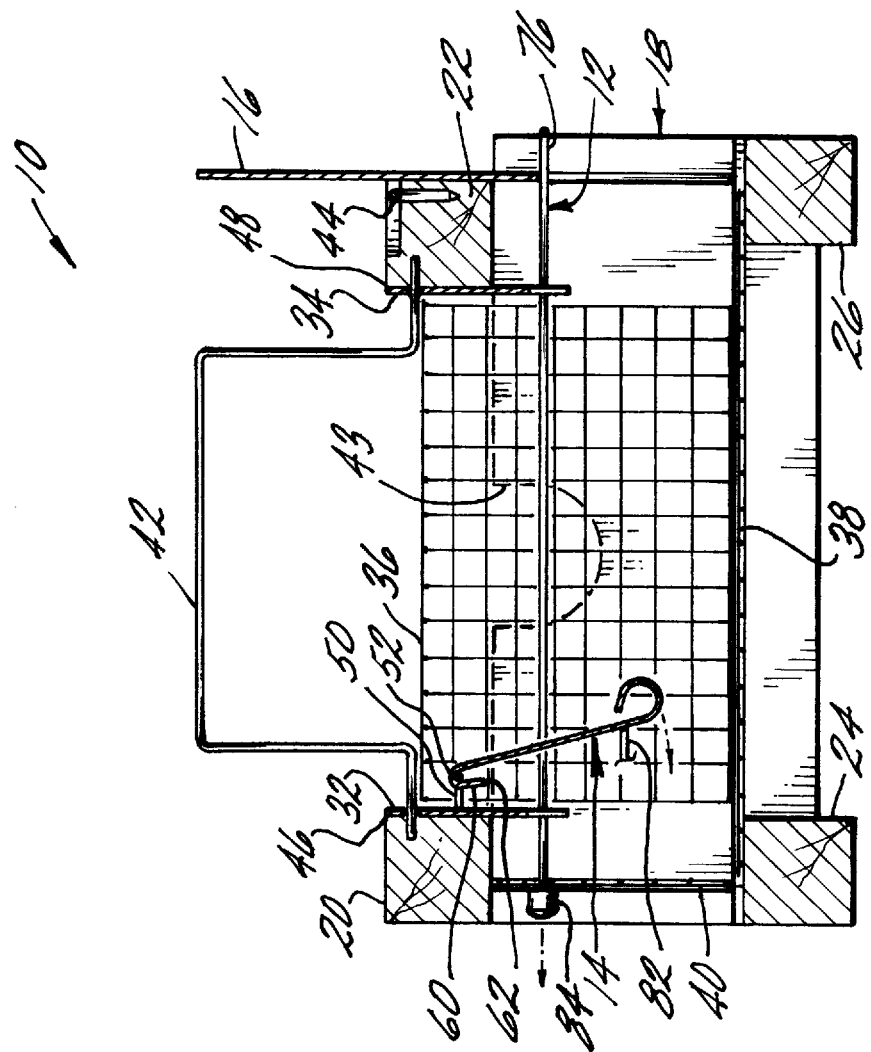
FIG. 2 is a sectional side elevation view taken along line 2—2 in FIG. 1 showing the handle and cover in place and the trap door set in the open position resting on two points of the setting mechanism.
Figure 4:
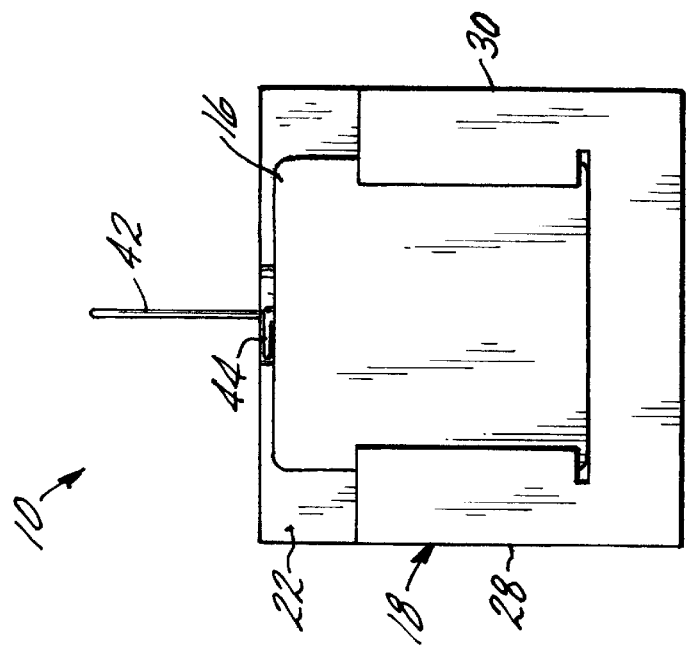
FIG. 4 is an end view of a small animal trap with the handle and cover in place and the trap door set in the closed position.
Figure 3:
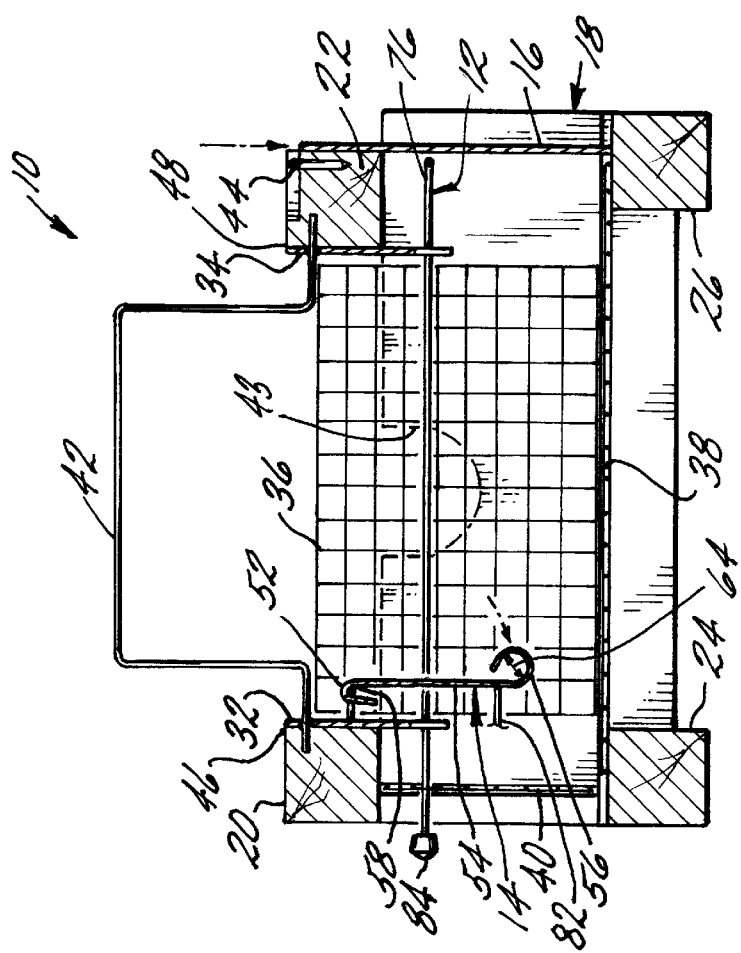
FIG. 3 is a sectional side elevation view along line 3—3 in FIG. 1 showing view the handle and cover in place and the trap door set in the closed position.

To set the trap, knob 84 (and thus setting mechanism 12) is pushed toward header 22. This causes trap door supporting segment 76 to extend, and provides two points of support for trap door 16. The movement of descending segment 80 extends angular segment 82 to a forward position as shown in FIG. 2. In this position, only a small amount of pressure need be exerted against bait holder 14 (as when the animal attempts to remove the bait), in order to cause setting mechanism 12 to move toward header 20. Movement of trap door supporting segment 76 toward header 20, that is, pushing by the animal, removes it from beneath trap door 16, thereby allowing trap door 16 to fall due to the force of gravity.

Wire mesh floor 38, wire mesh end piece 40 and wire mesh cover 36 are all made preferably from ¼" corrosion resistant hardware cloth. Other suitable materials would be perforated metal (¼" openings) or lucite plastic. Of course, any other suitable material may be used. Wire mesh floor 38 is preferably 2⅜" wide by 4½" long to fit in the aforementioned 0.090 inch wide grooves in sides 28, 30 and on the top surfaces of bases 24, 26. Wire mesh end piece 40 is preferably 1⅝" high and 2⅜" wide to fit into the vertical 0.090 inch wide grooves in sides 28, 30 at the end that includes header 20, base 24, bait holder hanger 50 and bait holder 14 when completely assembled. Wire mesh cover 36 is sized to fit in the space between headers 20, 22 and sides 28, 30. Wire mesh cover 36 is "U" shaped when looking in from the end view. Wire mesh cover 36 is preferably 2⅛" high, 3⅜" long and 1⅞" wide at the top of the "U" and is 2" wide at the bottom open end. When assembled, wire mesh cover 36 is locked into place by means of carrying handle 42 as described hereinbefore.

To summarize the present invention, the wire mesh cover 36 is removed by first pinching in carrying handle 42, and removing it from on top of wire mesh cover 36. Wire mesh cover 36 is removed by grasping it through finger notches 43 in sides 28, 30. The trap is then baited, the wire mesh cover 36 replaced and locked into place with carrying handle 42. The trap is then set externally by pushing setting mechanism button 84 toward the trap. This moves forward setting segment 12, allowing trap door 16 to rest on two points into the open, set, position. When the animal pushes on bait hook 14, setting mechanism 12 is moved back into the trap, removing support from trap door 16, which falls and traps the animal. The trap is easily set, and once an animal is caught, the trap and animal can be securely transported to another location.

While preferred embodiments have been shown and described, various modifications and substitutions may be made thereto without departing form the spirit and scope of the invention. Accordingly, it is to be understood that the present invention has been described by way of illustrations and not limitations.

What is claimed is:

1. A live animal trap comprising
   a cage body comprising a trap door forming a removable end of the cage body, two headers mounted onto each end of two sides, the two sides being mounted on two bases with a floor therebetween, two guide plates mounted onto the two headers, a removable wire mesh cover forming the top of a box between the two sides and the two headers, and a wire mesh end piece covering the end between one header, the floor and two sides, a swingably mounted removable bait holder mounted within the cage body, and a unitary setting mechanism mounted within the cage body, wherein the unitary setting mechanism comprises
   a wire member having a knob holding segment connected to one end of a trap door supporting segment, an angular extension holding segment connected to another end of the trap door supporting segment, the angular extension holding segment being parallel to the knob holding segment, a descending segment having a first and a second end, the first end being connected to the angular extension holding segment, the second end being connected to an angular segment, wherein the unitary setting mechanism is mounted such that
   movement of the setting mechanism toward the trap door causes the trap door supporting segment to extend, thereby providing two points of support for the trap door, and positioning of the angular segment adjacent the swingably mounted bait holder, such that a pressure in a direction away from the trap door causes the bait holder to swing against the angular segment which causes the door support segment to move out of contact with the trap door which causes the door to fall.

2. The live animal trap of claim 1, further comprising
   a removable handle which, when mounted, holds the wire mesh top in place, and when removed, allows removal of the wire mesh top.

3. The live animal trap of claim 1, wherein
   the swingably mounted removable bait holder comprises a hinge element for mounting in the cage body, a straight element connected to the hinge element, and a bait holding element connected to the straight element, wherein the bait holding element has a hole and the bait holding element and the straight element together form a hollow J-shape.

* * * * *